United States Patent
Ooka et al.

(10) Patent No.: US 7,143,572 B2
(45) Date of Patent: Dec. 5, 2006

(54) GAS TURBINE SYSTEM COMPRISING CLOSED SYSTEM OF FUEL AND COMBUSTION GAS USING UNDERGROUND COAL LAYER

(75) Inventors: Yuji Ooka, Tokyo (JP); Paul Sims, Sydney (AU)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 91 days.

(21) Appl. No.: 10/494,404

(22) PCT Filed: Nov. 8, 2002

(86) PCT No.: PCT/JP02/11646

§ 371 (c)(1),
(2), (4) Date: Sep. 14, 2004

(87) PCT Pub. No.: WO03/040531

PCT Pub. Date: May 15, 2003

(65) Prior Publication Data

US 2005/0011179 A1    Jan. 20, 2005

(30) Foreign Application Priority Data

Nov. 9, 2001    (JP)    ............................ 2001-345107

(51) Int. Cl.
*F02C 6/00* (2006.01)
*F02G 3/00* (2006.01)
*F02G 1/00* (2006.01)

(52) U.S. Cl. .................................... 60/39.182; 60/39.5
(58) Field of Classification Search ............ 60/39.181, 60/39.182, 39.183, 726, 39.5
See application file for complete search history.

(56) References Cited

U.S. PATENT DOCUMENTS

| | | | | |
|---|---|---|---|---|
| 4,434,613 A | * | 3/1984 | Stahl | ........................... 60/784 |
| 4,631,915 A | * | 12/1986 | Frewer et al. | ............. 60/39.12 |
| 5,402,847 A | | 4/1995 | Wilson et al. | |
| 5,566,756 A | | 10/1996 | Chaback et al. | |
| 6,637,183 B1 | * | 10/2003 | Viteri et al. | ............. 60/39.182 |
| 6,868,677 B1 | * | 3/2005 | Viteri et al. | .................. 60/784 |
| 2001/0015061 A1 | * | 8/2001 | Viteri et al. | ............. 60/39.161 |
| 2002/0023423 A1 | * | 2/2002 | Viteri et al. | ............... 60/39.02 |
| 2002/0100271 A1 | * | 8/2002 | Viteri et al. | ............. 60/39.182 |

FOREIGN PATENT DOCUMENTS

| | | |
|---|---|---|
| EP | 0 831 205 A2 | 3/1998 |
| WO | WO 97/07329 | 2/1997 |
| WO | WO 99/41490 | 8/1999 |

OTHER PUBLICATIONS

International Search Report for International Application No. PCT/JP02/11646 by the Japanese Patent Office dated Feb. 10, 2003.

(Continued)

*Primary Examiner*—William H. Rodriguez
(74) *Attorney, Agent, or Firm*—Marshall Gerstein & Borun

(57) ABSTRACT

A gas turbine system is configured to inhibit release of carbon dioxide to the atmosphere in such a manner that methane is combusted with oxygen that has been separated from air by an oxygen generator to allow an oxygen combustion type gas turbine to be driven. Carbon dioxide emitted from the turbine is fed under pressure into an underground coal bed along with an air component after separating the oxygen from the air and fixed into the coal bed, and the coal bed methane is collected above the ground by a gas drive action of the gas and supplied to the gas turbine as fuel.

13 Claims, 3 Drawing Sheets

OTHER PUBLICATIONS

Official Translation of the International Preliminary Examination Report by The International Bureau of WIPO dated Jun. 17, 2004 (4 pages).

Office action dated Mar. 28, 2006 issued by the Canadian Patent Office received in corresponding Canadian patent application 2,465,384.

* cited by examiner

GAS TURBINE SYSTEM COMPRISING CLOSED SYSTEM OF FUEL AND COMBUSTION GAS USING UNDERGROUND COAL LAYER

TECHNICAL FIELD

The present invention relates to a closed gas turbine system that combusts oxygen and methane collected from an underground coal bed by injecting exhausted carbon dioxide and separated nitrogen into the coal bed.

BACKGROUND ART

With remarkable advance of industrial activities, it has been strongly feared that carbon dioxide artificially emitted would cause environmental destruction on a global scale. Especially, since a vast amount of carbon dioxide is emitted from power generation systems using fossil fuel, it is necessary to control carbon dioxide emission to the atmosphere.

In order to control carbon dioxide emission to the atmosphere, researches have been conducted in various places. New Energy and Industrial Technology Development Organization (NEDO) has been researching a closed gas turbine power generation system with high power generation efficiency, for the purpose of reducing the amount of carbon dioxide emitted from power generation systems.

The gas turbine power generation system being researched in the NEDO is configured such that a steam turbine is connected to a closed-cycle gas turbine having a methane and oxygen combustor on the same shaft. The methane and oxygen combustor is configured to heat steam discharged from a high-pressure steam turbine, and a high-temperature gas turbine uses the steam as a drive gas. Thereafter, a part of the steam is extracted and supplied to a low-pressure steam turbine.

While the most part of carbon dioxide generated in the methane and oxygen combustor circulates within the gas turbine, carbon dioxide flowing along with the steam supplied to the low-pressure steam turbine is separated in a water condenser and then compressed by a compressor. The compressed carbon dioxide can be stored and fixed by a proper method.

In the manner as stated above, the closed gas turbine system can facilitate collecting carbon dioxide. But, in order to achieve this, high technology is necessary, and the closed gas turbine system is currently developed.

A collected carbon dioxide disposal method employed in this novel system has not been clarified. As a promising method of collecting carbon dioxide emitted from thermal power plants without releasing the carbon dioxide to atmosphere as a greenhouse gas, it is known that liquefied carbon dioxide is sequestrated in sea bottom or in underground water layer. Although it is expected that a vast amount of carbon dioxide can be sequestrated in the sea bottom, attention should be given to a possibility that the liquefied carbon dioxide is re-released to atmosphere for a long time period, for example, for several ten years or several hundred years.

Meanwhile, in order to meet an increasing demand for the energy, various energy sources have been developed, among which, gas contained in coal beds has been noticed. Coal beds exist throughout the world, and a vast amount of coal is buried therein. A vast amount of gas containing methane as major component is stored in the coal beds as coal bed methane. However, conventionally, in order to avoid danger in mining, the coal gas is released before mining. And, the coal gas is ventilated by air fed to cavities and emitted to atmosphere, or used as fuel in coal mining sites.

It is known that a vast amount of coal gas is adsorbed in the coals, and the coal gas is released when the coals are exposed in atmosphere or fluid is fed under pressure into the coal beds. Accordingly, it is considered that methane is collected from coal beds which are now incapable of being mined, or are too costly to be mined.

Further, the coal beds are promising as carbon dioxide gas sequestrating places, since the coal beds exist underground and carbon dioxide is adsorbed in and fixed to the coal beds.

DISCLOSURE OF THE INVENTION

Accordingly, an object to be achieved by the present invention is to provide a gas turbine system, in particular to a gas turbine power generation system, which is configured to use coal bed methane as fuel and to collect substantially all of generated carbon dioxide to inhibit release of carbon dioxide to atmosphere. Another object of the present invention is to provide a system configured to collect coal bed methane as fuel as much as possible.

In order to achieve the above described object, a gas turbine system in accordance with the present invention is capable of inhibiting release of carbon dioxide to atmosphere, the system being configured to drive an oxygen combustion type gas turbine by combustion of coal bed methane collected from an underground coal bed with oxygen separated from air, to feed the carbon dioxide gas emitted from the gas turbine under pressure into the underground coal bed along with the air containing nitrogen gas as major component after separating the oxygen from the air, and to fix the carbon dioxide into the coal bed, the methane being collected from the coal bed by feeding the gases under pressure and supplied to the gas turbine as fuel above the ground.

Also, a gas turbine system in accordance with the present invention, comprises an oxygen generator configured to extract oxygen from air; a gas turbine including a methane and oxygen combustor configured to combust methane with oxygen extracted by the oxygen generator; an exhaust gas condenser configured to separate carbon dioxide from a combustion gas of the gas turbine; a gas compressor configured to compress the carbon dioxide separated by the exhaust gas condenser and nitrogen generated by the oxygen generator; a feed piping configured to feed gas under pressure into an underground coal bed; and a collecting piping configured to collect methane from the coal bed, wherein a compressed gas generated by the gas compressor is fed under pressure into the coal bed through the feed piping to cause methane to be pushed out and to be collected into the collecting piping, and the collected methane is supplied to the methane and oxygen combustor, thereby inhibiting release of carbon dioxide to outside.

It is known that carbon dioxide fed under pressure is fixed into the coal bed having an ability to adsorb carbon dioxide. Since a vast amount of coal gas containing methane as a major component is contained in the coal beds without depending on quality of coals and fluidizes within the coal bed by feeding the carbon dioxide under pressure into the coal bed, the collecting piping is provided at a proper position within the coal bed to allow methane to be collected up above the ground.

The collected methane is used as fuel for the gas turbine.

If a gas containing oxygen is fed under pressure into the underground coal bed, there is a danger that methane is combusted underground, and a combustible component contained in the collected gas decreases and becomes unusable as fuel. Therefore, it is necessary to add incombustible gas if carbon dioxide as the gas being fed under pressure is deficient. But, by using air containing incombustible gas such as nitrogen after removing oxygen from the air, there is no danger that the coal bed methane is combusted underground.

When the coal bed methane is collected by feeding carbon dioxide under pressure, it is possible to collect the coal bed methane for a long period of time, but a total amount of the collected coal bed methane is not sufficiently large. The coal bed methane may be collected by feeding nitrogen under pressure. But in this case, a large amount of coal bed methane is released in an initial stage, but soon, the coal bed methane is not released any more. Therefore, sufficient coal bed methane cannot be collected.

It has been found that, by increasing a nitrogen composition ratio in an initial stage and by gradually increasing a carbon dioxide composition ratio with an elapse of time, a considerable amount of coal bed methane can be gained in a relatively initial stage. Besides, it has been found that, by doing so, the amount of collected coal bed methane does not substantially decrease after an elapse of time, and a total amount of collected coal bed methane becomes about fives times as much as coal bed methane collected by using only carbon dioxide.

Accordingly, when carbon dioxide generated in the gas turbine system is mixed with air containing nitrogen with larger composition ratio after separating oxygen from the air and the resulting mixture gas is fed under pressure into the underground coal bed, it is preferable that the amount of collected coal bed methane is ensured by adjusting a composition of the gas fed into the coal bed in such a manner that the nitrogen composition ratio in start of an operation of the system is set larger than the nitrogen composition ratio in an operation subsequent to the start of the operation of the system, and then is decreased with an elapse of time.

The gas turbine system of the present invention is configured such that a combustor combusts methane collected from the underground coal bed as fuel with oxygen separated from air as a combustion promoter, and carbon dioxide generated in the combustor is fed into the underground coal bed along with nitrogen separated from air, and fixed into the coal bed. Therefore, it is possible to fix substantially all of generated carbon dioxide underground and to thereby inhibit it from being released to atmosphere. In addition, it is economical that the air from which oxygen has been extracted and the carbon dioxide are used to collect methane from the coal beds.

In the gas turbine system of the present invention, the gas turbine may have a rotational shaft connected to a generator. The gas turbine system may further comprise a heat recovery boiler provided on a combustion gas exhausting piping of the gas turbine and configured to generate steam; and a steam turbine generator configured to generate an electric power using the steam supplied from the heat recovery boiler.

Since the power generation system in which the generator is connected to the gas turbine or the steam turbine is capable of fixing substantially all of carbon dioxide resulting from combustion of fuel into the underground coal bed, it is possible to inhibit release of carbon dioxide resulting from power generation in the conventional power generation system, which causes environmental pollution or global warming.

The above and further objects and features of the invention will more fully be apparent from the following detailed description with the accompanying drawings.

BEST MODE FOR CARRYING OUT THE INVENTION

Hereinafter, an embodiment of the present invention will be described.

Figure 1:
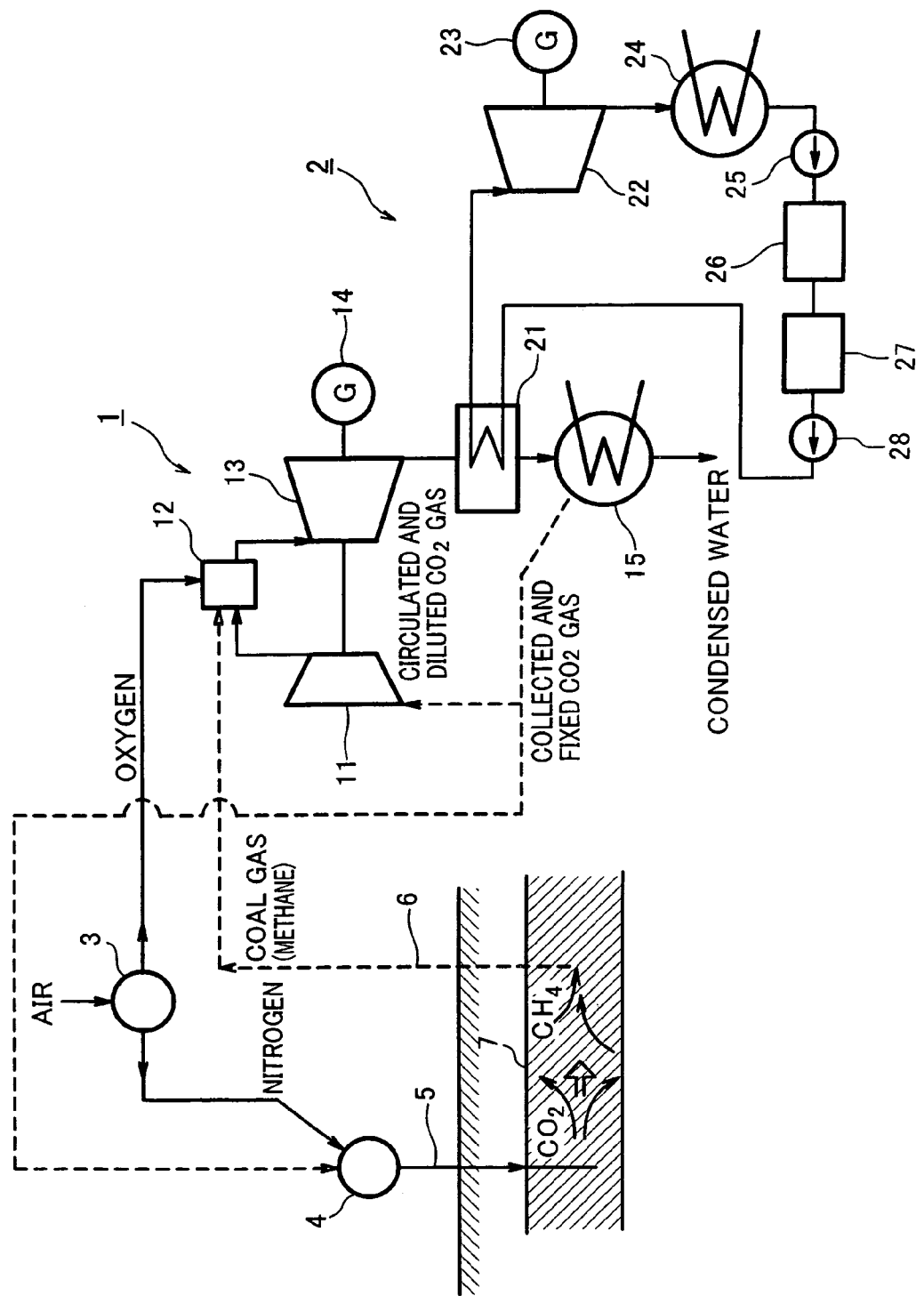
FIG. 1 is a block diagram of a gas turbine system according to a first embodiment of the present invention.
Figure 2:
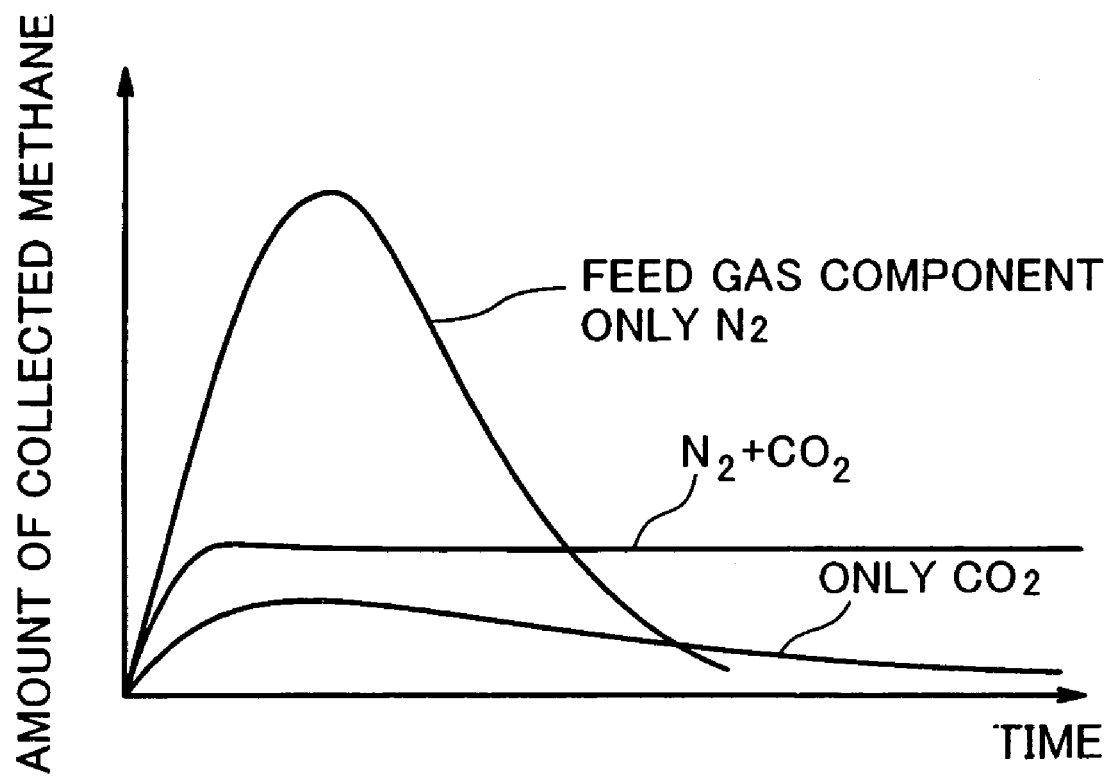
FIG. 2 is a graph showing time-series variation in the amount of collected coal bed methane.
Figure 3:
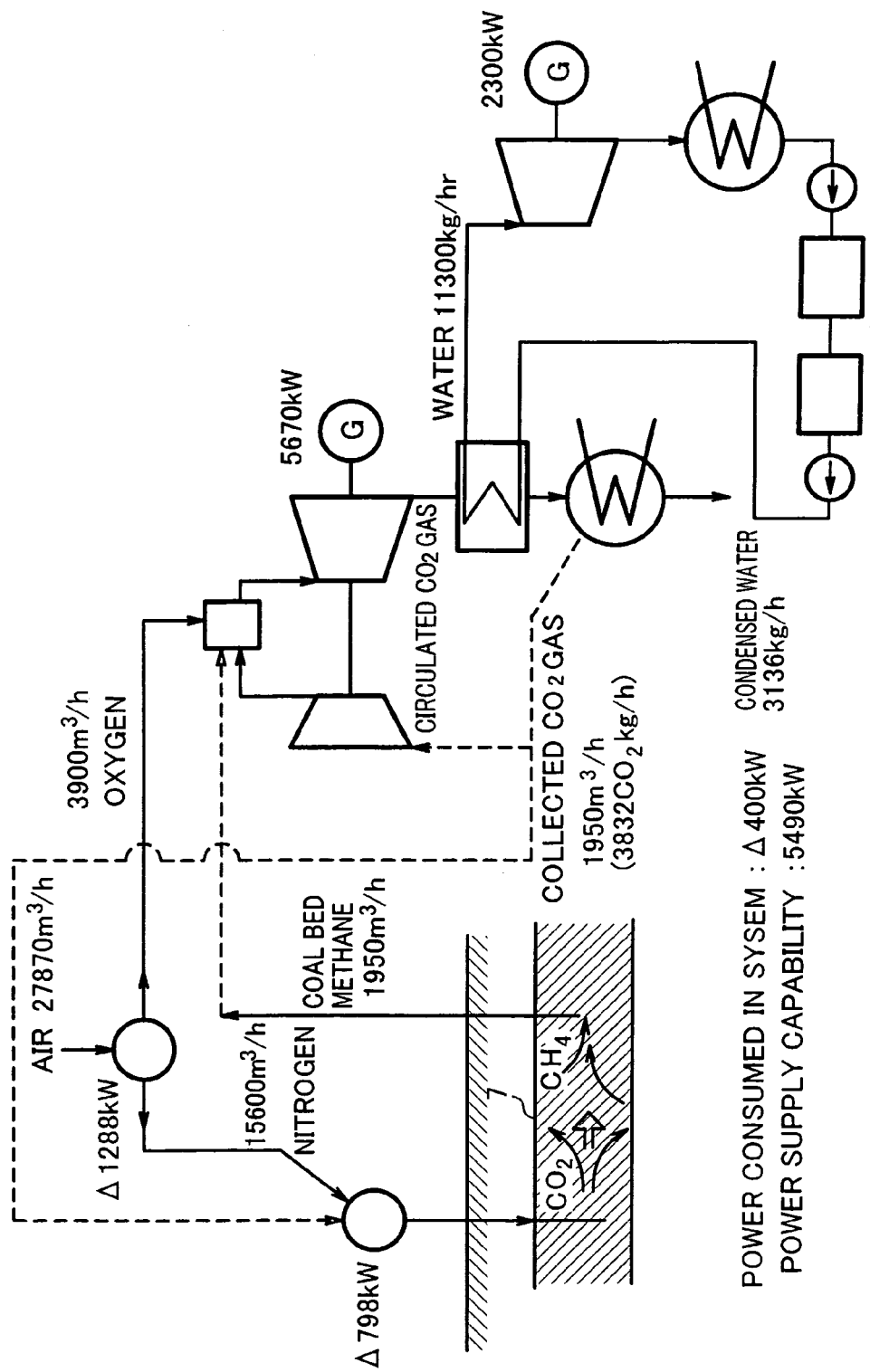
FIG. 3 is a view showing an example of a material balance in a plant to which the embodiment of the present invention is applied.

FIG. 1 is a block diagram showing an embodiment of a gas turbine system of the present invention. FIG. 2 is a graph showing time-series variation in the amount of collected coal bed methane, using a gas fed under pressure as a parameter. FIG. 3 is a view showing a material balance in a plant to which the embodiment is applied.

The gas turbine system shown in FIG. 1 comprises a gas turbine apparatus 1, a steam turbine apparatus 2, an oxygen generator 3, and a carbon dioxide and gas treatment equipment.

The gas turbine apparatus 1 comprises a compressor 11, a methane and oxygen combustor 12, a gas turbine 13, and a gas turbine generator 14. The compressor 11, the gas turbine 13, and the gas turbine generator 14 are connected to each other on the same shaft. The turbine 13 rotates to generate an electric power, which is distributed to consumers.

The methane and oxygen combustor 12 is configured to combust coal bed methane containing methane as a major component with oxygen, by injecting these gases. The resulting combustion gas is guided to the gas turbine 13 to drive the gas turbine 13. An exhaust gas of the turbine 13 contains a large amount of carbon dioxide and water resulting from combustion of the coal bed methane.

An exhausting piping of the gas turbine 13 is provided with an exhaust gas condenser 15. The exhaust gas is guided to the exhaust gas condenser 15, which collects condensed water. Uncondensed carbon dioxide and diluted gas are returned to the compressor 11.

At this time, an excess gas which is not circulated or spent in the gas turbine apparatus 1 is sent to a gas compression module 4 as a collected gas. This collected gas is water-free exhaust gas, and contains carbon dioxide as much as that newly generated in the gas turbine 13.

The exhausting piping of the gas turbine 13 is provided with a heat recovery boiler 21. The heat recovery boiler 21 produces steam using heat of the collected exhaust gas, and the steam turbine apparatus 2 generates an electric power and sends it to consumers.

The heat recovery boiler 21 heats water supplied by a water feed pump 28 by the exhaust gas and sends steam to the steam turbine generator 22. The steam turbine 22 is equipped with a generator 23. The steam whose pressure is reduced in the steam turbine 22 is converted into water in the water condenser 24. The water flows through a condensed water pump 25, a water heater 26, and a dearator 27 and is supplied to the heat recovery boiler 21 by the water feed pump 28. There, the water becomes high-temperature steam again, which drives the steam turbine 22 to cause the generator 23 to generate an electric power which is then distributed consumers.

The gas turbine system is equipped with an oxygen generator 3.

The oxygen generator 3 serves to separate oxygen from air, for example, by cooling the air to separate the oxygen from the air by utilizing a difference in boiling point. The oxygen generated by the oxygen generator 3 is sent to the methane and oxygen combustor 12, and air component containing nitrogen as a major component, which remains after extracting oxygen, is sent to the gas compression module 4.

The carbon dioxide and gas treatment equipment comprises the gas compression module 4, a gas feed piping 5, and a collecting piping 6. The gas compression module 4 compresses the air component other than oxygen and carbon dioxide and sends them to the gas feed piping 5 reaching the underground coal bed 7. From an opening of the gas feed piping 5 which is located within the coal bed 7, the air component and carbon dioxide are fed under pressure into the coal bed 7.

The collecting piping 6 reaching the coal bed 7 is provided at an appropriate position distant from the gas feed piping 5. An opening of the collecting piping 6 is located within the coal bed 7. The coal bed 7 contains a large amount of coal gas containing methane as a major component. The coal bed methane flowing into the collecting piping 6 is sent up above the ground. If the pressure of the coal bed methane is insufficient, a suction device installed on the ground may be utilized to send the coal bed methane up above the ground.

When the gas containing carbon dioxide and nitrogen is fed under pressure into the coal bed 7, the coal bed methane is pushed by a gas drive action, and gathers to the collecting piping 6 having a pressure lower than that of its surrounding region. For this reason, the collecting piping 6 is provided at a proper position within the coal bed 7 to collect the gas, thereby collecting the coal bed methane efficiently up above the ground.

The coal bed methane is supplied to the methane and oxygen combustor 12 and used as fuel for the gas turbine 13.

The collecting rate of the coal bed methane varies depending on a composition of the gas fed under pressure.

FIG. 2 shows a graph conceptually showing how the amount of the collected coal bed methane varies depending on the composition of the gas, with time on an abscissa axis.

When only carbon dioxide is used, the amount of collected coal bed methane gradually increases, and in time, becomes constant, and this state continues for a long time period. On the other hand, when only nitrogen is used, the amount of collected coal bed methane increases drastically in an initial stage, but in time, decreases drastically.

When a mixture gas containing nitrogen and carbon dioxide in a proper ratio is used, it has been found that a total amount of the coal bed methane capable of being collected increases noticeably. In addition, it has been found that, by controlling a component ratio between nitrogen and carbon dioxide in time series in such a manner that the ratio of nitrogen is set larger in an initial stage and then is gradually decreased, a predetermined amount of coal bed methane can be collected relatively earlier, the amount of collected coal bed methane increases, and the total amount of collected coal bed methane is approximately five times as large as the amount of coal bed methane collected by using only carbon dioxide.

Therefore, it is desired that the gas turbine system of this embodiment be equipped with a feed gas composition adjusting means so that the component ratio between nitrogen and carbon dioxide varies in time series in an optimized manner.

If a gas containing oxygen is fed under pressure, there is a danger that methane is combusted underground, and a combustible component contained in the collected gas decreases and becomes unusable as fuel. Therefore, it is necessary to add incombustible gas if carbon dioxide as the gas fed under pressure is deficient. But, by using air containing incombustible gas such as nitrogen after removing oxygen, there is no danger that the coal bed methane is combusted underground.

Since carbon dioxide fed under pressure is not returned up above the ground but fixed in the coal bed 7 having an ability to adsorb gases, the gas turbine system of the embodiment can inhibit release of carbon dioxide to atmosphere.

Also, combusting methane with oxygen is more desirable than combusting methane with air containing nitrogen, because the exhaust gas is free from NOX and hence does not significantly pollute environment.

A large amount of coal bed methane is not necessarily generated from high-quality coal beds, but the coal bed methane can be collected from low-quality coal beds such as degraded coal beds from which coals have been already commercially mined, or peat pog. Therefore, the gas turbine system of the present invention may be applied to reuse and utilize coal beds.

Subsequently, an example of material balance in the case where the present invention is applied to a power generation plant configured to generate nominal electric power of 7 MW will be described with reference to FIG. 3.

Here, it is assumed that power generation system uses natural gas of $16.69 \times 10^6$ kcal/hr as fuel and air with a flow rate of 21.5 kg/sec, and comprises a gas turbine generator that outputs a power of 5670 kW and a steam turbine generator that outputs a power of 2300 kW. A total power output is 7980 kW.

When using a coal gas, 100% of which is made up of methane, the power generation system requires coal bed methane of 1950 $m^3$/hr. In order to completely combust this coal bed methane, it is necessary to supply oxygen of at least 3900 $m^3$/hr. Although the gas turbine power generation system is operated under the condition in which air containing oxygen about three times as much as 3900 $m^3$/hr is supplied, i.e., oxygen is excessively supplied, efficiency can be increased by using pure oxygen. Therefore, in order to study substantial usability, values in FIG. 3 are set without considering combustion loss.

From calculations, water generated by combustion is estimated as 3136 kg/hr and a flow rate of the steam for driving the steam turbine apparatus is estimated as 11300 kg/hr based on heat balance.

Since a power required to separate oxygen from air is 0.33 kW per 1 $m^3$-oxygen, a power of 1288 kW is consumed to produce oxygen of 3900 $m^3$/hr. In addition to this, since a power consumed within the power generation system is estimated as about 400 kW, a power capable of being supplied to outside is estimated as 5490 kW from calculation.

In this case, generated nitrogen is 15600 $m^3$/hr and necessary air is 27870 $m^3$/hr.

Carbon dioxide generated from combustion is 1950 $m^3$/hr. Assuming that an operation rate of the system is 80%, carbon dioxide amounts to 7273 T per year, all of which is fixed into the coal beds.

Since production of methane becomes about five times larger in amount by using the mixture gas containing nitrogen and carbon dioxide, it is estimated that the coal bed methane of 1950 m³/hr can be gained by increasing the number of methane collecting wells formed in Akahira Tanko in Hokkaido Sorachi Cho from three to six.

This system is configured such that total amount of carbon dioxide generated within the system is fed under pressure along with nitrogen and fixed into the coal bed without releasing carbon dioxide to atmosphere, and a power of about 5500 kW obtained from power generation using the coal bed methane collected from the coal beds by feeding gas under pressure can be supplied to outside. Power generation efficiency is 28.2% and power supply capability is $38.4 \times 10^6$ kWh per year.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

In power generation in a gas turbine system of the present invention, since carbon dioxide generated in a gas turbine is fed under pressure to an underground coal bed to cause coal bed methane to be pushed out, and is fixed into the coal bed, it is possible to inhibit release of carbon dioxide to atmosphere which would cause environmental destruction.

In addition, since methane collected from the underground coal bed can be used as fuel for the gas turbine, production of the fuel and treatment of an exhaust gas can be carried out in a closed system.

The invention claimed is:

1. A gas turbine system comprising:
   an oxygen generator configured to extract oxygen from air;
   an oxygen combustion type gas turbine including a methane and oxygen combustor configured to combust methane with the oxygen extracted by the oxygen generator;
   an exhaust gas condenser configured to separate carbon dioxide from a combustion gas of the gas turbine;
   a gas compressor configured to compress the carbon dioxide separated by the exhaust gas condenser and nitrogen generated by the oxygen generator;
   a feed piping configured to feed gas under pressure into an underground coal bed; and
   a collecting piping configured to collect methane from the coal bed,
   wherein a compressed gas generated by the gas compressor is fed under pressure into the coal bed through the feed piping to cause the methane to be pushed out and to be collected into the collecting piping, and the collected methane is supplied to the methane and oxygen combustor, thereby inhibiting release of carbon dioxide to atmosphere.

2. The gas turbine system according to claim 1, wherein the gas turbine has a rotational shaft connected to a generator to allow an electric power to be generated.

3. The gas turbine system according to claim 2, further comprising:
   a heat recovery boiler provided on a combustion gas exhausting piping of the gas turbine and configured to generate steam; and
   a steam turbine generator configured to generate an electric power using the steam supplied from the heat recovery boiler.

4. The gas turbine system according to claim 2, wherein an amount of collected coal bed methane is increased by adjusting a composition of the gas fed into the coal bed in such a manner that a nitrogen component ratio in start of an operation of the system is set larger than a nitrogen component ratio in an operation subsequent to the start of the operation of the system, and a carbon dioxide component ratio is increased with an elapse of time.

5. The gas turbine system according to claim 2, wherein an amount of collected coal bed methane is increased by adjusting a composition of the gas fed into the coal bed in such a manner that a nitrogen component ratio in start of an operation of the system is set larger than a nitrogen component ratio in an operation subsequent to the start of the operation of the system, and a carbon dioxide component ratio is increased with an elapse of time.

6. The method according to claim 5, wherein an amount of the collected coal bed methane is increased by adjusting a composition of the gas fed into the coal bed in such a manner that a nitrogen component ratio in start of an operation of the system is set larger than a nitrogen component ratio in an operation subsequent to the start of the operation of the system, and a carbon dioxide component ratio is increased with an elapse of time.

7. The gas turbine system according to claim 1, wherein an amount of collected coal bed methane is increased by adjusting a composition of the gas fed into the coal bed in such a manner that a nitrogen component ratio in start of an operation of the system is set larger than a nitrogen component ratio in an operation subsequent to the start of the operation of the system, and a carbon dioxide component ratio is increased with an elapse of time.

8. A gas turbine system comprising:
   a closed system capable of inhibiting release of carbon dioxide to atmosphere, the closed system being configured to drive an oxygen combustion type gas turbine by a combustion gas resulting from combustion of methane collected from a coal bed with oxygen separated from air, to feed the carbon dioxide emitted from the gas turbine into the coal bed along with the air containing nitrogen as a major component after separating the oxygen from the air, and to fix the carbon dioxide into the coal bed, the methane being collected acceleratively from the coal bed and supplied to the gas turbine, wherein the gas turbine has a rotational shaft connected to a generator to allow an electric power to be generated, and further comprising:
   a heat recovery boiler provided on a combustion gas exhausting piping of the gas turbine and configured to generate steam; and
   a steam turbine generator configured to generate an electric power using the steam supplied from the heat recovery boiler.

9. The gas turbine system according to claim 8, wherein an amount of collected coal bed methane is increased by adjusting a composition of the gas fed into the coal bed in such a manner that a nitrogen component ratio in start of an operation of the system is set larger than a nitrogen component ratio in an operation subsequent to the start of the operation of the system, and a carbon dioxide component ratio is increased with an elapse of time.

10. A gas turbine system comprising:
a closed system capable of inhibiting release of carbon dioxide to atmosphere, the closed system being configured to drive an oxygen combustion type gas turbine by a combustion gas resulting from combustion of methane collected from a coal bed with oxygen separated from air, to feed the carbon dioxide emitted from the gas turbine into the coal bed along with the air containing nitrogen as a major component after separating the oxygen from the air, and to fix the carbon dioxide into the coal bed, the methane being collected acceleratively from the coal bed and supplied to the gas turbine, and wherein an amount of collected coal bed methane is increased by adjusting a composition of the gas fed into the coal bed in such a manner that a nitrogen component ratio in start of an operation of the system is set larger than a nitrogen component ratio in an operation subsequent to the start of the operation of the system, and a carbon dioxide component ratio is increased with an elapse of time.

11. The gas turbine system according to claim 10, wherein an amount of collected coal bed methane is increased by adjusting a composition of the gas fed into the coal bed in such a manner that a nitrogen component ratio in start of an operation of the system is set larger than a nitrogen component ratio in an operation subsequent to the start of the operation of the system, and a carbon dioxide component ratio is increased with an elapse of time.

12. A gas turbine system comprising:
a closed system capable of inhibiting release of carbon dioxide to atmosphere, the closed system being configured to drive an oxygen combustion type gas turbine by a combustion gas resulting from combustion of methane collected from a coal bed with oxygen separated from air, to feed the carbon dioxide emitted from the gas turbine into the coal bed along with the air containing nitrogen as a major component after separating the oxygen from the air, and to fix the carbon dioxide into the coal bed, the methane being collected acceleratively from the coal bed and supplied to the gas turbine, wherein the gas turbine has a rotational shaft connected to a generator to allow an electric power to be generated, and wherein an amount of collected coal bed methane is increased by adjusting a composition of the gas fed into the coal bed in such a manner that a nitrogen component ratio in start of an operation of the system is set larger than a nitrogen component ratio in an operation subsequent to the start of the operation of the system, and a carbon dioxide component ratio is increased with an elapse of time.

13. A method of operating a gas turbine system comprising the steps of:
collecting methane from a coal bed;
separating oxygen from air;
combusting the methane with the oxygen separated from the air;
driving an oxygen type gas turbine by a combustion gas resulting from the combustion of the methane;
feeding under pressure carbon dioxide emitted from the gas turbine into the coal bed along with the air containing nitrogen as a major component after separating the oxygen from the air to fix the carbon dioxide into the coal bed and promoting collection of the methane from the coal bed; and
feeding the methane to the gas turbine.

* * * * *

UNITED STATES PATENT AND TRADEMARK OFFICE
CERTIFICATE OF CORRECTION

PATENT NO.        : 7,143,572 B2  
APPLICATION NO. : 10/494404  
DATED             : December 5, 2006  
INVENTOR(S)      : Yuji Ooka et al.

It is certified that error appears in the above-identified patent and that said Letters Patent is hereby corrected as shown below:

On the First Page:

At line (54), "COAL LAYER" should be -- COAL BED --.

In the Specification:

At Column 1, line 4, "COAL LAYER" should be -- COAL BED --.

Signed and Sealed this

Twenty-third Day of October, 2007

JON W. DUDAS  
*Director of the United States Patent and Trademark Office*